United States Patent Office 3,352,773
Patented Nov. 14, 1967

3,352,773
METHOD OF DEGRADING POLYSACCHARIDES USING LIGHT RADIATION AND A WATER-SOLUBLE METAL OR NITROGEN BASE SALT OF NITROUS OR HYPONITRIC ACID
Anthony M. Schwartz, Washington, D.C., and Charles A. Rader, Laurel, Md., assignors to Gillette Research Institute, Inc., Washington, D.C., a corporation of Delaware
No Drawing. Filed Sept. 16, 1964, Ser. No. 397,028
5 Claims. (Cl. 204—160.1)

ABSTRACT OF THE DISCLOSURE

Polysaccharides such as starch and cellulosic materials are converted to saccharides of lower molecular weight by irradiation with light rich in frequencies in the neighborhood of 355 millimicrons in the presence of a water-soluble metal or nitrogen base salt of nitrous or hyponitric acid.

---

This invention relates to the treatment of polysaccharides for the purpose of lowering their molecular weight, or degrading them. The polysaccharides of particular interest include the naturally occurring polyglycosides, of which starch and cellulose are the best known examples; their derivatives such as the esters and the ethers that can be prepared from them; and their regeneration products such as regenerated cellulosic film or fiber. The term "degradation" is used to designate any process which a polymer (specifically a polymeric saccharide) may undergo that shortens the principal chain of the molecule, and thereby results in the formation of a polymer of lower molecular weight. Degradation may be mild or severe, and severe degradation may result in the loss of all molecules large enough to be classed as polymeric.

There are many situations in which it is desirable or necessary to degrade polysaccharides. Starch and cellulose, in particular, are polymers of very high molecular weight, and their soluble derivatives form solutions of very high viscosity even at low concentrations. It is often necessary to degrade the polymer for further convenient handling of these solutions. In converting cellulose to rayon or cellophane by means of the viscose process, for example, the cellulose is normally degraded before converting it to viscose. If it were not so degraded the viscose would have too high a viscosity per unit solids content, and could not be spun efficiently. This degradation is usually effected by controlled atmospheric oxidation of the cellulose in the presence of strong caustic soda. If the degraded cellulose is to be used for purposes other than making viscose, for example for conversion to esters, the caustic soda must be removed after the oxidation step by washing and/or neutralizing, an expensive and time consuming process. Degradation of cellulose can be brought about by oxidizing agents other than air. It can also be accomplished by hydrolytic reactions accompanied by oxidation. Cellulose is hydrolysed on a commercial scale by mineral acid solutions to yield oligomers of glucose and glucose itself. Cellulose can also be degraded by certain enzymes, apparently in a hydrolytic reaction. All these degradation methods have certain disadvantages. Either they are expensive and inefficient, or they require special purification or neutralization procedures after the degradation reaction to isolate the product of degradation in useful form. Starch, even more than cellulose, is subjected to degradation processes to convert it to useful articles of commerce. The thin-boiling starches, dextrins, British gums, and corn syrups are products of starch degradation. Starch is usually degraded either by heating, by treatment with aqueous mineral acid or by treatment with the amylolytic enzymes. These processes suffer from the same general disadvantages as those mentioned above in the case of cellulose.

Our invention provides a novel method of degrading polysaccharides, particularly polyglycosides, and more particularly starch, cellulose and their derivatives. The method of the invention has many advantages of control and simplicity that will become apparent in the following description. It is a photochemical process and consists essentially in irradiating the polysaccharide with light relatively rich in the ultraviolet frequencies in the presence of a compound containing the nitrite radical. Compounds that are suitable for use in the process include the water-soluble inorganic and nitrogen base salts of nitrous acid that furnish nitrite ion in aqueous solution. Representative salts that have proved effective include the nitrites of sodium, potassium, barium, calcium, zinc, magnesium, organic amines and ammonium.

Materials that can generate nitrite radicals in situ, under conditions prevailing in the reaction environment, can also be used. We have found, for example, that potassium or sodium hyponitrate, $Na_2N_2O_3$ (prepared by the method of Smith and Hein, J. Am. Chem. Soc. 82, 5731 (1960)) can be substituted for sodium nitrite. This material presumably is effective because it generates nitrite during the course of the reaction, although it may have a specific effect of its own.

The process may be carried out in a number of different ways depending on the form of the polysaccharide being treated. In the case of a cotton fabric, for instance, it is advantageous to deposit a nitrite solution uniformly on the fabric, preferably by dipping and wringing out, or by spraying to a definite wet pick-up value, and then evaporating off the water. This leaves the fabric bearing a controlled amount of nitrite, uniformly deposited throughout the fabric structure. This impregnated fabric is then exposed to ultraviolet light, which may be ordinary sunlight or may come from any convenient artificial U.V. source such as a carbon arc. As the irradiation proceeds it is revealed by chemical examination that the nitrite content of the fabric diminishes and the average molecular weight of the cellulose also diminishes. The average molecular weight is calculated from the increase in fluidity of cupriethylene diamine solutions of the cellulose, a standard procedure in cellulose chemistry. Simultaneously the tensile strength of the fabric decreases, a well recognized symptom of degradation. In fact the tensile strength loss of a cotton fabric, or other cellulosic fabric, is a good index of the degree of degradation it has suffered during treatment.

The wave lengths of light that bring about degradation in the presence of nitrite appear to be in the near ultraviolet region. The peak absorption of sodium nitrite is at 355 millimicrons. A substantial quantity of this wave length is present in sunlight and in carbon arc sources such as the Atlas Fadeometer (a commercial illuminating device for testing the light-fastness of dyed fabrics), but not in ordinary indoor illumination. Light of this wave length is very effective in promoting the degradation. The intensity of illumination has an effect on the rate of degradation, as in most photochemical reactions, the rate being increased at higher intensity.

The quantity of nitrite present affects both the extent and the rate of degradation, and is conveniently used as a controlling quantity in the reaction. As little as .04 percent sodium nitrite on the weight of fabric can cause a significant loss of tensile strength in cotton fabric after irradiation. At 1 percent dry add-on of sodium nitrite the degradation is rapid and extensive. Table I shows the effect on breaking strength of varying both the nitrite add-on and the time of exposure to the Fadeometer. It is evident that the Fadeometer light causes no significant degradation in the absence of nitrite, and that nitrite is completely ineffective in the dark or in ordinary indoor illumination.

TABLE I. DEGRADATION OF SODIUM NITRITE-TREATED COTTON

[80 x 80 cotton print cloth was used]

| Percent $NaNO_2$ on Fabric | Hours Exposed in Fadeometer | Percent Loss in Breaking Strength of Cotton |
|---|---|---|
| None | 0 [1] | 0 |
| None | 30 | 6 |
| .0042 | 30 | 0 |
| .042 | 30 | 12 |
| .25 | 5 | 44 |
| .50 | 5 | 60 |
| 1.00 | 5 | 71 |
| .25 | 15 | 53 |
| .50 | 15 | 69 |
| 1.00 | 15 | 72 |
| .25 | 30 | 51 |
| .50 | 30 | 69 |
| 1.00 | 30 | 80 |
| .25 | 0 [1] | 0 |
| .50 | 0 [1] | 0 |
| 1.00 | 0 [1] | 4 |
| .25 | 30 oven [2] | 0 |
| .50 | 30 oven [2] | 0 |
| 1.00 | 30 oven [2] | 0 |

[1] Stored at 70° F., 65% R.H.
[2] Stored 30 hrs. in a forced draft oven at 50° C. to simulate temperature effect of the Fadeometer.

The following are some of the characteristic features of the degradation reaction that have been found in studies of the method of the invention: Nitrite is progressively consumed during the reaction, and for each molecule of nitrite radical that disappears one scission of the cellulose chain occurs. Actinometric studies, using clear cellophane as the cellulosic material being degraded, indicate that several thousand mole equivalents of light may be absorbed per mole of nitrite that reacts. Using light in the near U.V. range, the amount of degradation per hour exposure depends both on the intensity of the light and the quantity of nitrite present. The reaction appears to proceed as well in an inert atmosphere as in air, and excess percentages of oxygen in the atmosphere do not promote it. As the reaction proceeds a progressively increasing amount of water-extractable material is produced. This material appears to consist mainly of glucose, cellobiose and lower anhydroglucose polymers. As the reaction proceeds the carbonyl content of the water-insoluble portion increases, commensurates with the number of chain scissions as estimated from the fluidity increase. The carboxyl content also increases but to a lesser extent. Table II shows the progressive decrease in nitrite content and degree of polymerization during the degradation of cellophane.

TABLE II.—DEGRADATION OF CELLOPHANE SAMPLES

| | Untreated Cellophane | | | Cellophane Containing 1.2% Sodium Nitrite | | |
|---|---|---|---|---|---|---|
| Hours Exposed in Fadeometer | 0 | 32 | 48 | 0 | 32 | 48 |
| Observed Fluidity, Rhes | 35.5 | 37.4 | 39.5 | 35.4 | 56.4 | 59.5 |
| Intrinsic Viscosity | 1.92 | 1.86 | 1.78 | 1.93 | 0.88 | 0.74 |
| Degree of Polymerization | 240 | 230 | 220 | 240 | 110 | 90 |
| Chain Scissions per Chain | 0 | 0.2 | 0.3 | 0 | 3.4 | 4.1 |
| Carboxyl Content (mmole/g.) | .040 | .043 | .042 | 0.039 | 0.053 | 0.058 |
| Percent of Original $NaNO^2$ Recovered after Exposure | N/A | N/A | N/A | 100 | 22 | 5 |

Table III shows similar data for cotton. Table IV shows the changes in carboxyl and carbonyl content of cotton as photo-degradation in the presence of nitrite proceeds.

TABLE III.—PHOTODEGRADATION OF UNTREATED COTTON AND SODIUM NITRITE-TREATED COTTON

[All treated samples originally contained .107 mmol $NaNO^2$/g. Unless otherwise indicated samples were water-extracted before being dissolved in Cuene.]

| Hours Exposed in Fadeometer | $NaNO^2$ Content, mmols/g. | Percent Loss in Tensile Strength | Observed Cuene Fluidity, rhes | $[\eta]$ | D.P. | S |
|---|---|---|---|---|---|---|
| 0 [1] | 0 | 0 | 1.05 | 20.5 | 3,200 | 0 |
| 0 | .107 | 0 | 1.27 | 19.5 | 3,040 | 0 |
| 1 | .089 | 31 | 19.8 | 3.42 | 534 | 11 |
| 1 [2] | .089 | 31 | 17.0 | 4.00 | 616 | 9 |
| 5 | .063 | 55 | 31.6 | 2.10 | 328 | 19 |
| 14 | .041 | 60 | 33.2 | 1.95 | 243 | 27 |
| 14 [2] | .041 | 60 | 38.1 | 1.60 | 198 | 32 |
| 30 | .028 | 64 | 40.0 | 1.55 | 192 | 33 |
| 30 [1] | 0 | 10 | 1.45 | 17.2 | 2,700 | 1 |

[1] Untreated cotton.
[2] Not extracted before Cuene fluidity determination.

TABLE IV.—CHEMICAL CHANGES IN DEGRADED COTTON

[All samples originally contained .107 mmol $NaNO^2$/g. See Table III for physical data on these samples]

| Hours exposed in Fadeometer | Carboxyl Content, mmols/g. | Carboxyl Content After Oxidation With Chlorous Acid | Carbonyl Content, mmols/g. | Carbonyl Content After Oxidation With Chlorous Acid | Estimated [1] End-Group Aldehyde, mmols/g. |
|---|---|---|---|---|---|
| 0 | .0105 | | [2] <.020 | | .002 |
| 1 | .0155 | .0193 | .032 | | .023 |
| 1 [3] | .0144 | | .031 | | .019 |
| 5 | .0266 | .0274 | .071 | .029 | .039 |
| 14 | .0254 | | .091 | | .054 |
| 14 [3] | .0310 | | .086 | | .064 |
| 30 | .0296 | .0341 | .114 | .100 | .066 |

[1] Estimated from number of chain scissions.
[2] Sensitivity limit of test.
[3] Not extracted before analysis.

The fact that nitrite is consumed during the photodegradation, and that its presence is necessary for the photodegradation to occur, affords an excellent point of control for the process. The limit of degradation can be set simply by setting the add-on of nitrite prior to irradiation. Regardless of how long the irradiation is continued after all the nitrite has been consumed no further degradation will take place, beyond the very slight photodegradation that all cellulose suffers in air.

The nature of the nitrogenous products formed from the nitrite during the photodegradation reaction has not been established completely. Nitrous oxide appears to be one of the products formed when the irradiation takes place in air. The remainder of the nitrogen is in the form of an as yet unidentified nonvolatile material that is readily soluble in water.

For practical purposes it is evident that the material to be degraded should preferably be in finely divided form or in the form of a relatively flat sheet. Bulkier forms make it more difficult for the U.V. illumination to reach all parts of the nitrite-laden polysaccharide.

The following examples illustrate how the process may be applied to various polysaccharides (all parts are given by weight):

Example 1

The degree of polymerization of the cellulose was estimated by the following procedure: The fluidity of a dispersion of the cellulose in cupriethylene diamine was determined (Ref. 1) and this observed fluidity converted to the fluidity at a velocity gradient of 500 seconds$^{-1}$ (Ref. 2). Relative and specific viscosities were calculated from the corrected fluidities and specific viscosity was then converted to intrinsic viscosity (Ref. 3). The degree of polymerization was calculated as 156 times the intrinsic viscosity (Ref. 4). 100 parts of cellulose pulp (degree of polymerization equals 870) was slurried with approximately 300 parts of water in which 1 part of sodium nitrite was dissolved. The slurry was cast onto glass plates at a controlled thickness to deposit 0.8 gram of cellulose per 100 square centimeters, and air dried. The dry mats of cellulose plus sodium nitrite were exposed to carbon arc irradiation in an Atlas Electric Device Model X–1–A Weatherometer for periods of one hour, or longer, up to thirty-two hours. The mats were exposed at a distance of 50 cm. from the carbon arc. "Sunshine" carbons, which produce a relatively high proportion of near ultraviolet light, were used. The ambient temperature in the weatherometer cabinet was held at 44±3° C. After their exposure to the carbon arc light the mats of cellulose were washed with water to remove unused sodium nitrite. The washing also removed small amounts of glucose and other water soluble degradation products. The presence of water soluble reducing sugars was estimated by descending, column paper chromatography techniques (Ref. 5). These water-solubles amounted to less than one percent, by weight, of the original cellulose even in the highly degraded sample exposed to light for 32 hours. The degree of polymerization of the degraded pulp samples, exposed for various times, are summarized in Table V below. Also given in Table V are the amounts of sodium nitrite, consumed in the degradative reactions, based on analyses of the wash liquors. Sodium nitrite analyses were carried out by a colorimetric method (Ref. 6)

TABLE V.—PHOTODEGRADATION OF CELLULOSE PULP TREATED WITH SODIUM NITRITE
[1 part sodium nitrite per 100 parts cellulose]

| Hours of Exposure to Carbon Arc Irradiation | Degree of Polymerization | Percent of Originally Applied Sodium Nitrite Consumed |
|---|---|---|
| 0 | 870 | 0 |
| 1 | 702 | 32.5 |
| 4 | 433 | 51.3 |
| 32 | 238 | 84.6 |

Mats of cellulose, with no added sodium nitrite, were not measurably degraded by 32 hours exposure to the carbon arc irradiation. Mats of the cellulose containing sodium nitrite and exposed only to ordinary indoor fluorescent illumination for periods of three days showed no loss of sodium nitrite and no decrease in degree of polymerization of the cellulose.

References:
(1) Lindsley, C. H.: Textile Res. J., 21, 286 (1951).
(2) Conrad, C. M., and Tripp, V. W.: Textile Res. J., 16, 275 (1946).
(3) Tripp, V. W., Conrad, C. M., and Mares, T. J.: J. Phys. Chem. 56, 693 (1952).
(4) Immergut, E. H., Ranby, B. G., and Mark, H. F.: Ind. and Eng. Chem., 45, 2483 (1953).
(5) Hough, L., Jones, J. H. N., and Wadman, W. H.: J. Chem. Soc., 1950, 1702.
(6) Shinn, M. B.: Ind. and Eng. Chem. Anal. Ed., 13, 33 (1941).

Example 2

Mats of cellulose pulp plus sodium nitrite were prepared essentially by the procedure of Example 1 except that they were varied in thickness to deposit from 0.4 gram to 3.2 grams of cellulose per 100 square centimeters. Sodium nitrite contents were varied from 0.2 part to 5 parts of sodium nitrite per 100 parts of cellulose. The mats were exposed to carbon arc irradiation, as in Example 1, for 16 hours. Table VI on the next page summarizes the degree of polymerization of the degraded samples and the amounts of sodium nitrite consumed in the degradative reactions.

TABLE VI.—DEGRADATION OF CELLULOSE PULP TREATED WITH SODIUM NITRITE AND EXPOSED TO CARBON ARC IRRADIATION FOR 16 HOURS

| Experiment No. | Density of Cellulose Mat, g./per 100 sq. cm. | Weight Ratio, Sodium Nitrite/ Cellulose | Degree of Polymerization [1] | Precent of Originally Applied Sodium Nitrite Consumed |
|---|---|---|---|---|
| 1 | 0.4 | 1/500 | 616 | 91 |
| 2 | 3.2 | 1/500 | 624 | 88 |
| 3 | 1.6 | 1/100 | 351 | 75 |
| 4 | 1.6 | 1/100 | 401 | 64 |
| 5 | 0.4 | 1/20 | 126 | 71 |
| 6 | 3.2 | 1/20 | 456 | 25 |

[1] Degree of polymerization of undegraded pulp is 870.

A comparison of Experiments No. 1 and No. 2 in the above table vs. No. 5 and No. 6 indicates that absorption of light by nitrite places a much greater limitation on thickness than absorption of light by cellulose.

Example 3

100 parts of corn starch and 1 part of sodium nitrite were slurried with enough water to produce a paste, which was spread on glass plates to deposit 1.6 grams of starch per 100 square centimeters. The deposited sheets were air dried and then exposed to carbon arc irradiation, as in Example 1, for 6 hours. After irradiation the degraded starch was washed with cold water to remove unused sodium nitrite. The viscosity of a 3.45% solution of the degraded starch was found to be 4 centipoises, compared to a viscosity of 82 centipoises for a 3.45% solution of the original undegraded starch. For the starch viscosity measurements, 10 grams of starch (corrected for moisture content) was dispersed in a total of 280 grams of water, then heated for 15 minutes in a boiling water bath. The resultant starch solution was cooled for 30 minutes in a thermostated 25° C. bath and then its viscosity was determined with a Brookfield viscosimeter. Analysis of the wash liquor showed that 62% of the sodium nitrite originally deposited with the starch was consumed in the photodegradative reaction. Corn starch, with no added sodium nitrite, was not degraded by 6 hours exposure to carbon arc irradiation. Sheets of the starch plus sodium nitrite exposed only to ordinary indoor fluorescent illumination for periods of three days showed no loss of sodium nitrite and no degradation of the starch, as evidenced by viscosity.

The 4 centipoise viscosity of the photodegraded starch compares with a viscosity of 12 centipoises for "thin-boiling" starch prepared by acid hydrolysis of the starch. Procedure for acid hydrolysis of corn starch: 30 grams of corn starch was slurried in 400 ml. of 0.1 N sulfuric acid and the mixture was heated with stirring, for 1 hour at 50° C. The suspension was then neutralized with sodium carbonate, filtered, washed with cold water, and dried. (Ref. 7)

Reference:
(7) Kerr, R. W.: "Chemistry and Industry of Starch," p. 54, Academic Press, New York, 1944.

It is evident that many modifications may be made in the mechanical arrangements for irradiating and for bringing the material to be degraded in contact with the nitrite prior to irradiation. Starch, for example, after nitrite impregnation, can be irradiated while it is floated in powder form on an air stream in a large flue or chamber. Cellulose in the form of linters or floc can be irradiated in a similar manner. The polysaccharides can also be irradiated, after nitrite treatment, in the form of continuous sheets, as illustrated in the examples above, provided the sheets are not so thick as to be substantially opaque to the entering light. Sheets may be illuminated from both sides, in which case they can be substantially thicker than if illuminated from one side only.

Instead of treating the material to be degraded with aqueous solutions of compounds containing the nitrite radical, the material may be treated with aqueous slurries of such compounds or with solutions or slurries of such compounds in non-aqueous liquids. Also instead of drying the material before irradiation, the material wet with solutions or slurries of nitrite radical-containing compounds in water or in non-aqueous liquids having a low absorption of radiation in the near ultraviolet, can be irradiated with ultraviolet light without eliminating the solvent or suspension medium.

We claim:
1. In the conversion of polysaccharides to saccharides of lower molecular weight by irradiating the polysaccharide with light rich in frequencies of about 355 millimicrons, the improvement which consists in carrying out the irradiation in the presence of a water-soluble metal or nitrogen base salt of nitrous or hyponitric acid in an amount equivalent to from about 0.04 to about 5 parts by weight of sodium nitrite based on 100 parts by weight of the polysaccharide.

2. A method as defined in claim 1 wherein the polysaccharide is wetted with a solution of a water-soluble salt of nitrous acid and dried prior to irradiation.

3. A method as defined in claim 2 wherein the polysaccharide is cellulose.

4. A method as defined in claim 2 wherein the polysaccharide is starch.

5. A method as defined in claim 2 wherein the polysaccharide is a regenerated cellulose.

References Cited

Whistler et al.: "Starch: Chemistry and Technology," 1965, Academic Press, pp. 414–419.

GEORGE F. LESMES, *Primary Examiner.*

SAMUEL H. BLECH, *Examiner.*

R. B. TURER, *Assistant Examiner.*